Jan. 19, 1954

G. RAISBECK

BALANCED AMPLIFIER EMPLOYING TRANSISTORS OF COMPLEMENTARY CHARACTERISTICS

Filed Sept. 18, 1951

2,666,819

INVENTOR
G. RAISBECK
BY Harry C. Hart
ATTORNEY

Patented Jan. 19, 1954 2,666,819

UNITED STATES PATENT OFFICE 2,666,819

BALANCED AMPLIFIER EMPLOYING TRANSISTORS OF COMPLEMENTARY CHARACTERISTICS

Gordon Raisbeck, Morristown, N. J., assignor to Bell Telephone Laboratories, Incorporated, New York, N. Y., a corporation of New York Application September 18, 1951, Serial No. 247,155

4 Claims. (Cl. 179—171)

This invention relates to circuits employing translating devices in pairs and in particular to novel transistor circuits in which an N-type transistor is paired with a P-type transistor to give new and useful behavior.

The discovery and publication of the transistor as an electric translating device has led to the development of various translating circuits embodying the transistor as an active element. In general, such translating circuits resemble earlier vacuum tube circuits in so far as the transistor is the counterpart of the vacuum tube, and differ in certain respects as required by the differences between the characteristics of the transistor and those of its predecessor, the vacuum tube. An example is found in the current push-pull transistor amplifier which is described in an application of R. L. Wallace, Jr., Serial No. 184,457, filed September 12, 1950, now Patent No. 2,652,460, issued September 15, 1953. It is also described in an article by R. L. Wallace, Jr., and G. Raisbeck, entitled, "Duality as a Guide in Transistor Circuit Design," published in the Bell System Technical Journal for April 1951, vol. 30, page 381. So far as is known, in all cases where transistors have been paired, the transistors have been alike in every respect or as nearly so as techniques of fabrication would permit. Such developments follow the example of the pairing of vacuum tubes of like characteristics.

Unlike the tube, however, the transistor may take two forms, the N-type of the original Bardeen-Brattain Patent 2,524,035, and the newer P-type. The latter is the subject of an application of W. G. Pfann, Serial No. 90,022, filed April 27, 1949. It is described in an article by W. G. Pfann and G. H. Scaff, published in the Proceedings of the Institute of Radio Engineers for October 1950, vol. 38, page 1151.

The present invention is based on the realization that the discovery of the P-type transistor permits the pairing of circuit elements whose characteristics are alike in shape but opposite in sign where such pairing leads to advantages. It contemplates such pairing in the case of a circuit which bears a superficial resemblance to a push-pull circuit and which offers all the known advantages of push-pull circuits, such as suppression of harmonics of even order, without the necessity of a balanced input circuit connection or of a balanced output circuit connection. In accordance with the invention, therefore, a P-type transistor is paired with an N-type transistor, a first electrode of each transistor, for example its base, being directly connected for signal frequency purposes to the corresponding electrode of the other transistor. An input signal may then be applied to the two second electrodes, for example the emitter electrodes, in parallel, while the output may be derived from the two third electrodes, for example the collector electrodes, in parallel, both input and output being returned to the first electrodes. The input and output circuit connections are evidently unbalanced, but because of the inversion of the sign of the characteristics of each transistor with respect to those of the other, application of the unbalanced input signal in this fashion results in the generation of an amplified replica with suppression of even order harmonics and other related advantages which are well known in connection with push-pull circuits. Again, because of the characteristic inversion, this amplified and purified signal may be derived from the transistor collector electrodes in parallel by way of an unbalanced circuit.

The invention will be fully apprehended by reference to the following detailed description of preferred embodiments thereof taken in connection with the appended drawings, in which.

Figure 1:
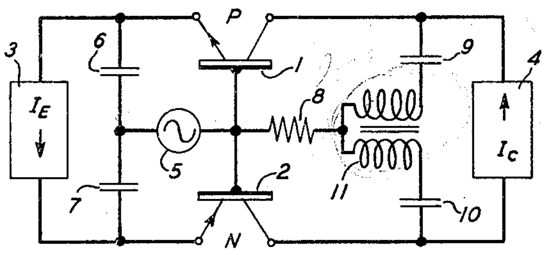
Fig. 1 is a schematic circuit diagram of an amplifier embodying the invention.

Referring now to the drawings, Fig. 1 shows a P-type transistor 1 and an N-type transistor 2 whose base electrodes are connected together. This common connection may if desired be grounded. Operating current is supplied to the emitters of both transistors from a constant current source 3, and operating current is supplied to the collectors of both transistors from a second constant current source 4. In the case of each of these constant current sources, the arrow indicates the direction of flow of positive operating current. As is well known, operating current flows positively into the emitter of an N-type transistor and negatively into its collector, while the opposite is true with respect to a P-type transistor.

A signal source 5 is connected to the common base terminal of the two transistors. and its signals are applied by way of a first blocking condenser 6 to the emitter electrode of the P-type transistor, and by way of a second blocking condenser 7 to the emitter electrode of the N-type transistor. From the signal frequency standpoint, therefore, the emitter electrodes of the two transistors are connected in parallel. Similarly, a load which may be of any desired variety and is here illustrated for simplicity as a resistor 8, is connected from the common base terminal of the two transistors by way of a blocking condenser 9 to the collector electrode of the P-type transistor and by way of another blocking condenser 10 to the collector electrode of the N-type transistor. Here again from the signal frequency standpoint the collector electrodes are connected to the load in parallel. A transformer 11 of close coupling and unity turns ratio is included to ensure that any departure of the collector current of either transistor from equality with the source current $I_c$ shall be accompanied by an equal and opposite departure in the collector current of the other transistor.

Because both the input circuit and the output circuit are returned to the common terminal of the two transistor base electrodes, both of these circuits may be unbalanced. Despite this, the pairing of the two units in the fashion described results in a suppression of harmonics of even order which may be generated by non-linear behavior of the individual transistors. The manner in which this comes about may be understood by considering the effects of the application of a signal to both the transistors in the manner described. Because of the differences between their characteristics, a positive signal applied to the emitter of the N-type transistor 2 tends to drive it more and more into the "on" condition and towards saturation while the same positive signal applied to the emitter electrode of the P-type transistor 1 tends to drive it towards the "off" condition, i. e., towards its collector voltage cut off. Thus deviations of the output of the one transistor from a linear relation to its input tend to be offset by the equal and opposite deviations of the other transistor from a linear relation with its input.

Figure 2:
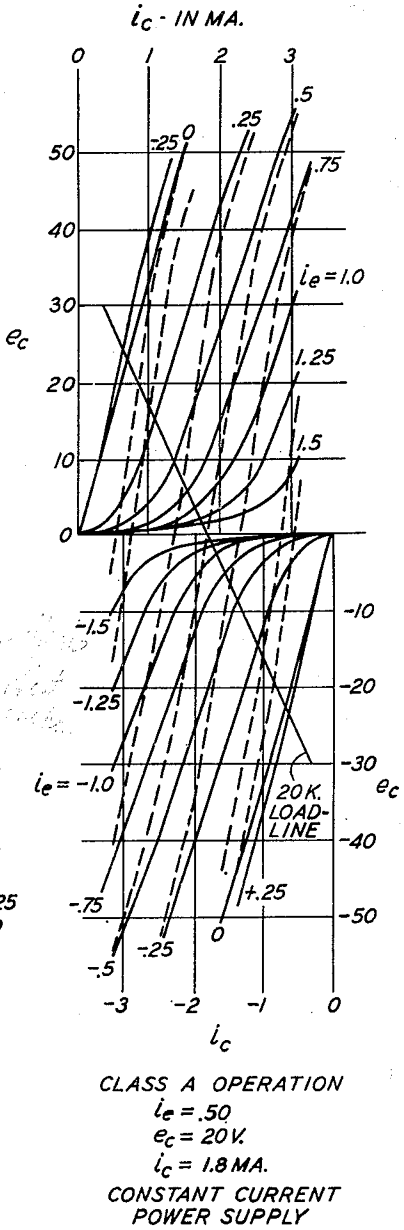
Fig. 2 is a group of transistor voltage-current characteristic curves of assistance in explaining the operation of the apparatus of Fig. 1.

This mode of operation will be clear from a consideration of Fig. 2 where the characteristics of a P-type transistor and of an N-type transistor are plotted to the same scale, one above the other, and displaced from each other to the extent that the abscissa representing 1.8 milliamperes for the first transistor coincides with the abscissa representing 1.8 milliamperes for the other transistor. The upper part of the figure shows the characteristics of the P-type transistor and the lower part shows the characteristics of the N-type transistor. Compound characteristics are shown by broken lines which extend over both parts of the figure. A load line representing a load of 20,000 ohms is shown intersecting the characteristics. Operation is represented by movement of the operating point along this load line. By considering the current and voltage relations at various points of this line it is evident that while the first order effects are additive in the load, second order effects tend to offset each other. Thus the effective operation of a push-pull circuit has been achieved without a push-pull connection. The inversion of the lower group of characteristics with respect to the upper one is due in the present case to the character of the units themselves so that, while this result is obtained in a push-pull vacuum tube circuit by virtue of the application of a signal to the several input electrodes of the tubes in opposite phase, it is secured in the present instance when the signal is applied to the two transistors in the same phase.

Figure 3:
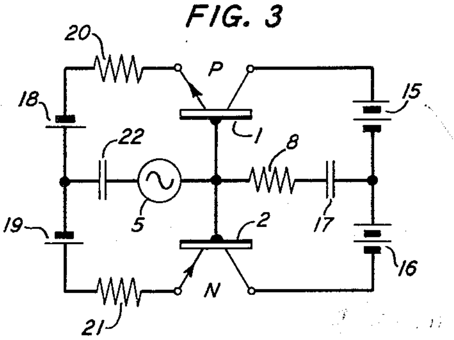
Fig. 3 is a schematic circuit diagram of a variant of Fig. 1.

Fig. 3 shows an alternative form of the invention including an amplifier comprising a P-type transistor 1 paired with an N-type transistor 2. From the signal frequency standpoint the circuit is similar to that of Fig. 1, the differences lying principally in the manner in which the operating biases are supplied. Instead of the constant current source 4 of Fig. 1, constant voltage sources such as batteries 15, 16 are shown in Fig. 3 as applying a definite voltage between the collector electrodes of the two transistors. The common terminal of these two batteries may if desired be grounded. As before, a load 8 is connected between this ground point and the common terminal of the two base electrodes, a blocking condenser 17 now being included in series with the load to prevent the flow of direct current. Instead of the constant current source 3, emitter biases are supplied similarly from two batteries 18, 19 and by way of padding resistors 20, 21. The common terminal of these two batteries is connected by way of a blocking condenser 22 to one terminal of a signal source 5 whose other terminal is connected to the base electrodes of the two transistors.

While it is known that the operation of a transistor is more satisfactory when supplied with fixed biasing currents than with fixed biasing voltages, the arrangement of Fig. 3 offers the advantage that the collector-to-base circuit of each transistor constitutes a comparatively high resistance in series with the operating voltage bias source for the other transistor, so that the arrangement partakes at least in part of a constant current supply, while utilizing sources of the simpler type.

Figure 4:
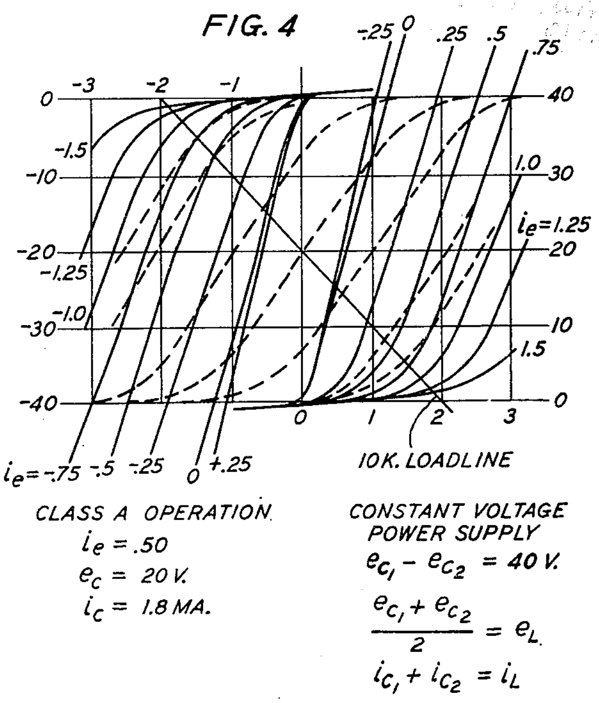
Fig. 4 is a group of transistor voltage-current characteristic curves of assistance in explaining the operation of the apparatus of Fig. 3.

Qualitatively, the operation of the circuit of Fig. 3 is the same as that of the circuit of Fig. 1. Quantitatively it is best analyzed in terms of paired sets of characteristics, the one set for the P-type transistor and the other set for the N-type transistor. However, because the operating bias supplies are now in the form of fixed voltages instead of fixed currents, the characteristics are placed side by side as in Fig. 4. The composite characteristics are indicated by broken lines as in the case of Fig. 2 and a 10,000-ohm load line is shown intersecting them. Consideration of the voltage-current conditions which obtain at successive points along this load line shows that while the first order effects are additive, second order effects which would otherwise result in the generation of even order harmonics are suppressed by virtue of the connections of the invention.

While the invention has been described as applied to an amplifier, it will be obvious to those skilled in the art that it may be employed in connection with a modulator, a detector, an oscillator or indeed any other circuit for any other function as desired.

Subject matter related to the foregoing is claimed in a copending application of the same inventor, Serial No. 254,569, filed November 2, 1951, and in an application of W. Shockley, Serial No. 246,428, filed September 13, 1951.

What is claimed is:

1. Apparatus which comprises a pair of transistors each of which has a first terminal, a second terminal, and a third terminal, like numbered terminals of said transistors being alike in function, one of said transistors being characterized by voltage-current characteristics which are like those of the other transistor in shape but 1,4 opposite in sign, the first terminals being directly connected together, means for applying a signal to the second terminals in parallel, and means for extracting a translated signal from the third terminals in parallel.

2. Apparatus as defined in claim 1, wherein each of said two transistors comprises a semiconductive body and wherein said bodies are constructed of materials of opposite conductivity types.

3. Apparatus as defined in claim 2, wherein said first terminals are connected, respectively, to the base electrodes of said transistors, said second terminals are connected, respectively, to the emitter electrodes of said transistors, and said third terminals are connected, respectively, to the collector electrodes of said transistors.

4. Signal translating apparatus which comprises a pair of transistors, each of which has a body of semiconductor material, an emitter electrode, a base electrode and a collector electrode engaging said body, the semiconductor material of one of said bodies being of one conductivity type and the semiconductor material of the other of said bodies being of opposite conductivity type, whereby said transistors are characterized by voltage-current characteristics which are alike in shape but opposite in sign, the base electrodes of said two transistors being directly connected together, means for applying an input signal to said emitter electrodes in parallel, and means for withdrawing a translated signal from said collector electrodes in parallel.

GORDON RAISBECK.

References Cited in the file of this patent

UNITED STATES PATENTS

| Number | Name | Date |
|---|---|---|
| 2,370,221 | Barney | Feb. 27, 1945 |
| 2,570,938 | Goodrich | Oct. 9, 1951 |
| 2,570,978 | Pfann | Oct. 9, 1951 |